US005257028A

United States Patent [19]
Keydel et al.

[11] Patent Number: 5,257,028
[45] Date of Patent: Oct. 26, 1993

[54] METHOD OF EXTRACTING PHASE ERRORS CAUSED BY THE ATMOSPHERE IN THE BACKSCATTER SIGNAL OF A COHERENT IMAGING RADAR SYSTEM CARRIED BY A CARRIER FROM RADAR RAW DATA AND APPARATUS FOR CARRYING OUT THE METHOD

[75] Inventors: Wolfgang Keydel, Hechendorf; Joao R. Moreira Neto, Landsberg, both of Fed. Rep. of Germany

[73] Assignee: Deutsche Forschungsanstalt für Luft- und Raumfahrt e.V., Cologne, Fed. Rep. of Germany

[21] Appl. No.: 910,589

[22] Filed: Jul. 8, 1992

[30] Foreign Application Priority Data

Jul. 19, 1991 [DE] Fed. Rep. of Germany ....... 4124062

[51] Int. Cl.$^5$ ............................................. G01S 13/90
[52] U.S. Cl. .................................... 342/25; 342/159
[58] Field of Search ...................... 342/25, 26, 159

[56] References Cited

U.S. PATENT DOCUMENTS

| | | | |
|---|---|---|---|
| 3,659,291 | 4/1972 | Anthony | 342/49 X |
| 3,778,602 | 12/1973 | Schmitt | 342/399 X |
| 3,866,227 | 2/1975 | Ruvin | 342/405 |
| 4,387,373 | 6/1983 | Longuermare, Jr. | 342/25 |
| 4,663,631 | 5/1987 | Brilman et al. | 342/422 |
| 5,029,307 | 7/1991 | Osaki | 342/25 |
| 5,034,748 | 7/1991 | Goedeke et al. | 342/99 |
| 5,043,734 | 8/1991 | Niho | 342/25 |
| 5,045,855 | 9/1991 | Moreira | 342/25 |
| 5,148,452 | 9/1992 | Kennedy et al. | 375/96 |

FOREIGN PATENT DOCUMENTS 0083107 7/1983 European Pat. Off. .

*Primary Examiner*—John B. Sotomayor
*Attorney, Agent, or Firm*—Browdy and Neimark

[57] ABSTRACT

In a method of extracting phase errors caused by the atmosphere in the backscatter signal of an on-board coherent imaging radar system from radar raw data, firstly to image areas with different backscatter ratios over a predetermined period of time consecutive azimuth spectra are continuously formed. Thereupon, a frequency offset ($\Delta F(t)$) of the backscatter ratio component is obtained by determining the location of the maximum of the correlations between two respective immediately consecutively formed azimuth spectra. Then, a double integration for the difference of the frequency offset ($\Delta F(t)$) and a desired value ($\Delta F_{soll}$) of the frequency offset is carried out, the frequency offset desired value ($\Delta F_{soll}$) being determined either from the carrier forward velocity ($V_v$) or by a low-pass filtering of the frequency offset ($\Delta F(t)$), and finally for standardization the result of the double integration is multiplied by a constant ($2\pi/\Delta t$) to obtain thereby the phase error ($\phi_e(t)$).

2 Claims, 4 Drawing Sheets

METHOD OF EXTRACTING PHASE ERRORS CAUSED BY THE ATMOSPHERE IN THE BACKSCATTER SIGNAL OF A COHERENT IMAGING RADAR SYSTEM CARRIED BY A CARRIER FROM RADAR RAW DATA AND APPARATUS FOR CARRYING OUT THE METHOD

BACKGROUND OF THE INVENTION

1. Field of the Invention

The invention relates to a method of extracting phase errors caused by the atmosphere in the backscatter signal of a coherent imaging radar system carried by a carrier from radar raw data and an apparatus for carrying out the method.

2. Description of the Prior Art

By means of coherent imaging radar systems, which may be carried by aircraft and spacecraft, to determine the instantaneous signal phase the variation of the flight path can be exactly determined for example with the aid movement sensors. Since however the atmosphere is not homogeneous either in the lower region, the troposphere, or in the upper region, the ionosphere, the radar signal received has additional phase fluctuations. Consequently, imaging radar systems carried by aircraft or spacecraft, particularly those with synthetic aperture, even when they move on undisturbed or exactly known flight paths have a restricted resolution in the flight direction, this being due to the atmospherically induced phase errors or fluctuations.

In coherently operating imaging radar systems these phase errors lead to distortions and errors; this considerably impairs the quality of the radar images; under some circumstances, an imaging even becomes completely impossible. The resolution in the range direction therefore depends on the system bandwidth and is not influenced by the atmosphere. For example, the resolution obtainable at present from spacecraft without phase error correction is about 10 m in the flight direction.

Criteria for the quality of an imaging are derived from the resolution, the image contrast and the geometrical distortion. However, all these criteria are impaired by phase errors.

To obtain high resolution, high contrast and a low geometrical distortion of the imaging, the raw data received must therefore be corrected before the processing or generation of an image. This correction can be carried out in real time or off-line. A real time correction during the reception of the backscatter signal is carried out by digital or analog control elements whilst an off-line correction is carried out on the ground after storing the raw data with the aid of computer programs.

SUMMARY OF THE INVENTION

The invention is intended to provide a method of extracting phase errors caused by the atmosphere in the backscatter signal of a coherent radar system carried by a carrier from radar raw data and an apparatus for carrying out the method with which the phase errors caused by the atmosphere, in particular the troposphere, the ionosphere, etc., can be determined very accurately, the raw data corrected therewith and thereafter images obtained which are as free from errors as possible and of high quality.

The invention therefore proposes in a method of extracting phase errors caused by the atmosphere in the backscatter signal of a coherent imaging radar system carried by a carrier from radar raw data in which for imaging areas with different backscatter ratios over a predetermined period of time successive azimuth spectra are continuously formed and a frequency offset ($\Delta F(t)$) of the backscatter ratio component is obtained by determining the position of the maximum of the correlations between two respective immediately successively formed azimuth spectra, the improvement in which a double integration of the difference of the frequency offset ($\Delta F(t)$) and a desired value ($\Delta F_{soll}$) of the frequency offset is carried out, the frequency offset desired value ($\Delta F_{soll}$) being determined either from the carrier forward velocity ($V_v$) or by a low-pass filtering of the frequency offset ($\Delta F(t)$) and thereafter for standardization the result of the double integration is multiplied by a constant ($2\pi/\Delta t$) to obtain the phase error ($\phi_e(t)$).

The invention also proposes in an apparatus for carrying out the aforementioned method and comprising a means for detecting an azimuth spectrum to form continuously successive azimuth spectra, a means for correlation formation between two respective directly successively formed azimuth spectra and a means for forming the maximum of the correlation and determining the frequency offset ($\Delta F(t)$), the improvement comprising a means for forming a difference from the frequency offset ($\Delta F(t)$) and a desired value ($\Delta F_{soll}$) of the frequency offset, the desired frequency offset ($\Delta F_{soll}$) being determinable from the carrier forward velocity ($V_v$) or by a filtering of the frequency offset ($\Delta F(t)$) by means of a low-pass filter, two integrating units connected in series and following the difference-forming means and a standardizing unit which follows the second integrating unit and at the output of which the phase error ($\phi_e(t)$) caused by the atmosphere is obtained.

Generally, according to the invention the azimuth spectrum of the radar raw data is evaluated. To evaluate the azimuth spectrum two methods are employed, that is the method known from DE 39 42 428 C2 for determining a frequency offset of a socalled backscatter ratio component of the azimuth spectrum and the method according to the invention for determining the phase error from the determined frequency offset. According to the invention, for this purpose a double integration of the difference of the frequency offset and a desired value of the frequency offset is carried out.

The frequency offset desired value is obtained either from the forward velocity of the carrier or by a low-pass filtering of the frequency offset calculated. Thereafter, the result obtained by the double integration is multiplied by a constant for standardization, thereby giving the phase error caused by the atmosphere, in particular the troposphere and the ionosphere.

The two methods for determining the frequency offset of the backscatter ratio component of the azimuth spectrum and for determining the phase error from the determined frequency offset may be carried out in real time for example with the aid of an array processor or a parallel computer or alternatively off-line by a conventional computer system.

After a correction, which will be referred to below as phase error correction, can be carried out by the processing or generation of an image. The generation of the image here consists of a correlation between the raw data and the theoretical phase history to be expected. After the correlation, a high-revolution two-dimensional image is then obtained and with the aid of the phase error correction according to the invention a resolution in the flight direction down to about 1 m and possibly even less can be achieved, whereas hitherto, as already explained above, the resolution obtainable from spacecraft without such a phase error correction was about 10 m.

BRIEF DESCRIPTION OF THE DRAWINGS

The invention will be explained in detail hereinafter with reference to a preferred embodiment with the aid of the attached drawings, wherein:

FIG. 3a shows schematically the azimuth spectrum of a range gate;

FIG. 3b shows the schematic profile of the antenna pattern component of the spectrum illustrated in FIG. 3a;

FIG. 3c shows the schematic profile of the backscatter ratio component of the spectrum illustrated in FIG. 3a and FIG. 4 shows the schematic profile of an azimuth spectrum for two different instants ($t=i-1$ and $t=i$) and a correlation of the azimuth spectra offset in time.

DESCRIPTION OF THE PREFERRED EMBODIMENT

Figure 3C:
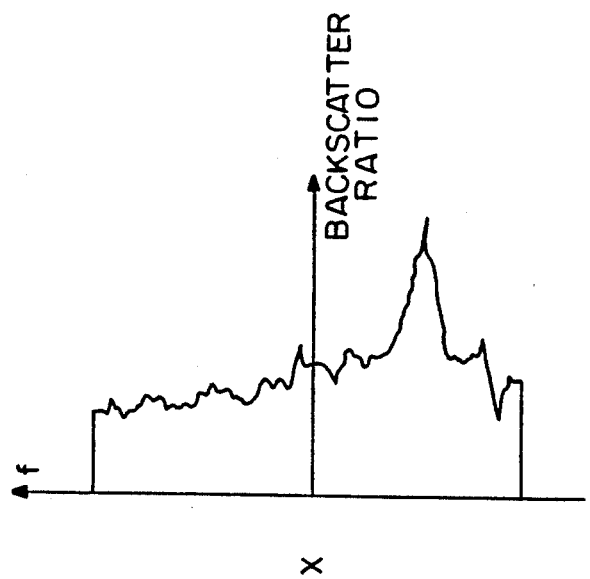
FIGS. 3a to 3c are schematic illustrations of diagrams which together form the azimuth spectrum.
Figure 3B:
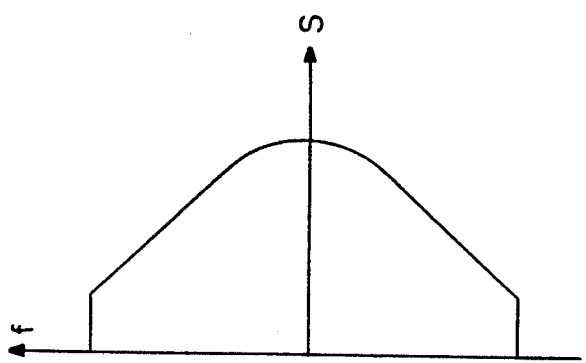
Figure 3A:
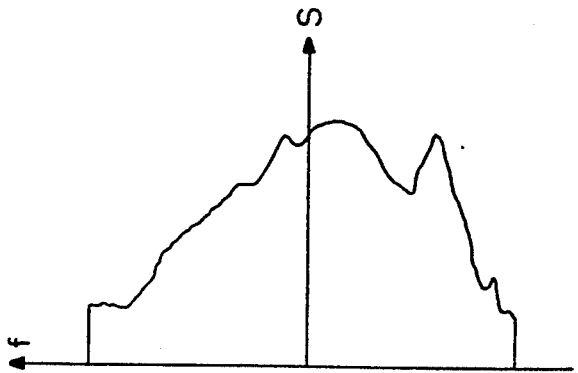

In FIG. 3a an azimuth spectrum of a range gate is illustrated schematically, the frequency f being plotted along the vertical axis and the power S along the horizontal axis. In FIGS. 3b and 3c in further schematic curves the makeup of the azimuth spectrum in FIG. 3a is illustrated; once again, the frequency f is plotted in each case along the vertical axes and the power S along the horizontal axes.

As apparent from FIGS. 3b and 3c, the azimuth spectrum of a range gate schematically set forth in FIG. 3a is made up essentially of the product of the antenna pattern component in the azimuth direction illustrated in FIG. 3b and the backscatter ratio component illustrated in FIG. 3c; below, for the determination of a phase error $\phi_e(t)$ caused by the atmosphere only the backscatter ratio component will be employed.

Figure 4:
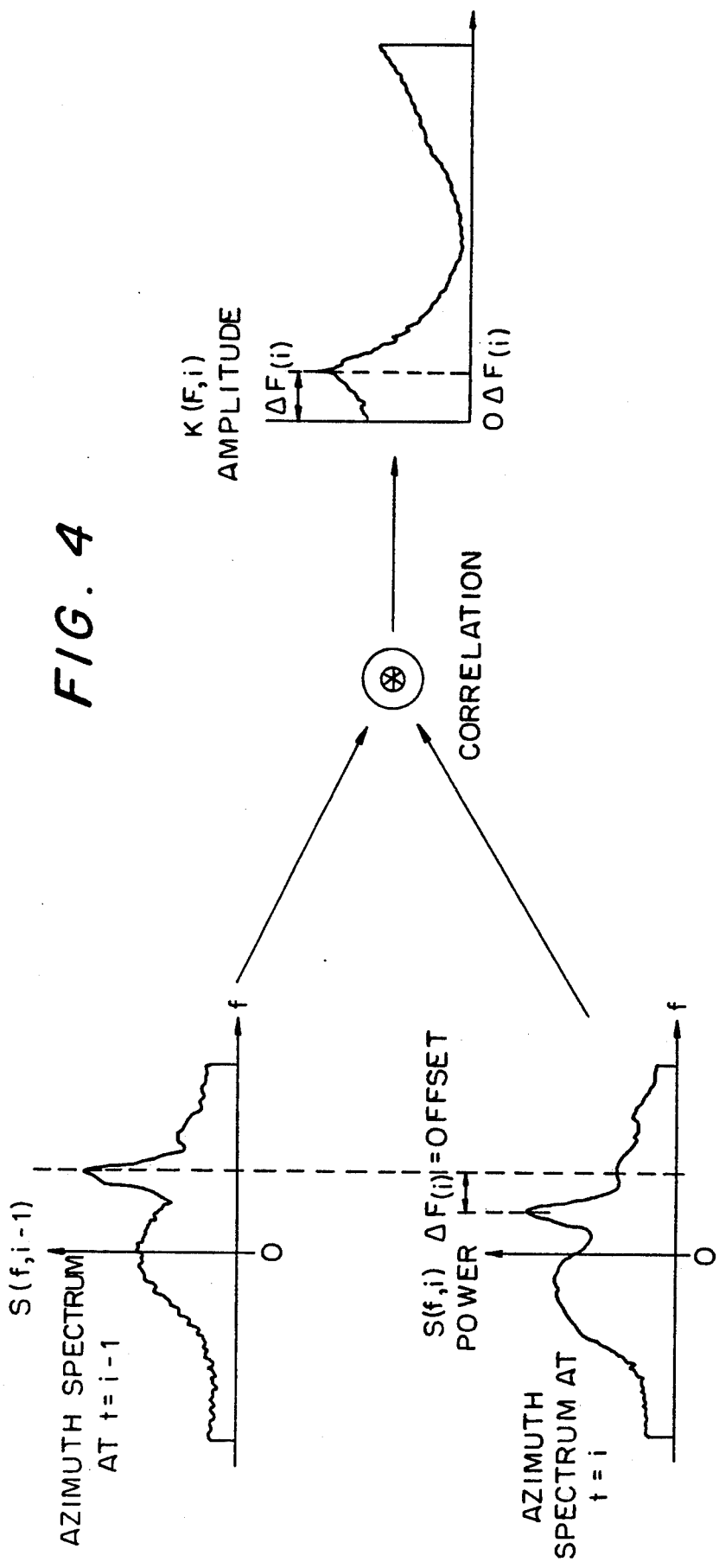

In the socalled reflectivity displacement method described in DE 39 22 428 C2, the frequency offset between two azimuth spectra consecutive in time is evaluated. In FIG. 4 two such azimuth spectra are illustrated, in the upper part for the time $t=i-1$ and in the lower part for the time $t=i$, i being an integer greater than 1. In the two azimuth spectra, in this case the powers S are plotted on the vertical axes as a function of the frequency f on the horizontal axes. Furthermore, in the lower diagram an offset $\Delta F(i)$ or $\Delta F(t)$ of a maximum compared with the azimuth spectrum in the upper part of FIG. 4 is shown. The relationship between the time t and the number i is given by $$t = \Delta t \cdot i,$$

$\Delta t$ being the time interval between the recordings of the spectra.

The two consecutively taken spectra are therefore very similar to each other and a corresponding frequency shift with a frequency offset $\Delta F$ (in Hz) is obtained:

$$\Delta F = \text{frequency offset (Hz)} \approx \frac{2 \cdot V_v^2(t) \cdot \Delta t}{\lambda \cdot R} + \frac{2 \cdot V_b(t) \cdot \Delta t}{\lambda}, \quad (1)$$

wherein R denotes the distance of the range gate from an antenna mounted on the carrier, $\Delta t$ the time interval of the recordings of the spectra, $V_b$ the velocity error in the viewing direction of the antenna and $\lambda$ the wavelength of the transmitted signal. Movement errors of the carrier are to be corrected and/or not present and consequently $V_v(t) = V_v$ or is constant, and the velocity error $V_b$ or the acceleration error $\dot{V}_b$ in the viewing direction are equal to zero.

The frequency offset of a flight free from movement errors is therefore:

$$\Delta F \approx -\frac{2 \cdot V_v^2 \cdot \Delta t}{\lambda \cdot R} \quad (2)$$

As already stated at the beginning, however, phase errors arise in the atmosphere because the latter has physical and chemical properties which are irregular and depend on the location and time. Due to these propagation errors of the electromagnetic waves of the radar system the backscatter signal has a phase fluctuation which appears in the radar system as phase error $\phi_e(t)$; the phase $\phi_e(t)$ is thus a random variable.

The frequency offset $\Delta F(t)$ as a function of the velocity $V_v$ and the phase error $\phi_e(t)$ can be represented with the aid of equation (2) as:

$$\Delta F(t) \approx -\frac{2 \cdot V_v^2 \cdot \Delta t}{\lambda \cdot R} + \frac{\rho_e(t) \cdot \Delta t}{2\pi}, \quad (3)$$

wherein $\rho_e(t)$ is the second derivative of the phase error $\phi_e(t)$.

The phase error $\phi_e(t)$ caused by atmosphere can be determined with the aid of the frequency offset $\Delta F(t)$ in accordance with equation (3) as:

$$\phi_e(t) = \frac{2\pi}{\Delta t} \int\int (\Delta F(t) - \Delta F_{soll}) dt dt, \quad (4)$$

where $$\Delta F_{soll} = -\frac{2 V_v^2 \Delta t}{\lambda R}. \quad (5)$$

If the forward velocity $V_v$ of the carrier is known, the frequency offset desired value $\Delta F_{soll}$ can be calculated with the aid of equation (5). If however the forward velocity $V_v$ of the carrier is not known, the frequency offset desired value $\Delta F_{soll}$ can be determined by a loss-pass filtering of the frequency offset $\Delta F(t)$. Since the second derivative $\phi_e(t)$ does not have a constant level, only the first term of equation (3) is allowed to pass in the low-pass filtering, i.e. $\Delta F_{soll}$. With the aid of equation (5) and with the aid of the method described in DE 39 22 428 C2 the forward velocity $V_v$ can be determined on the basis of $\Delta F_{soll}$ and thus be employed for processing the raw data.

Figure 1:
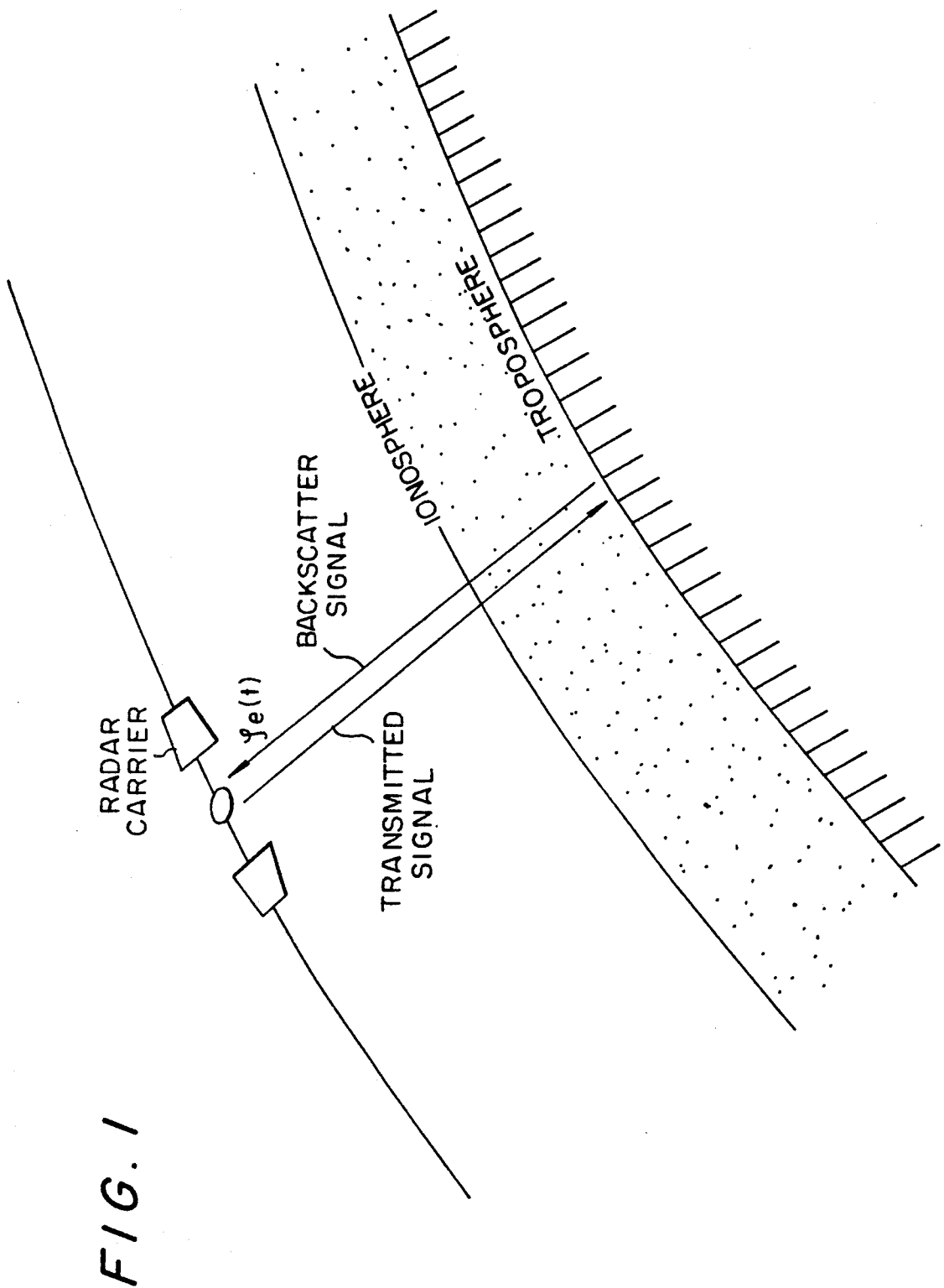
FIG. 1 shows schematically a general illustration of the signals between a radar carrier and ground.
Figure 2:
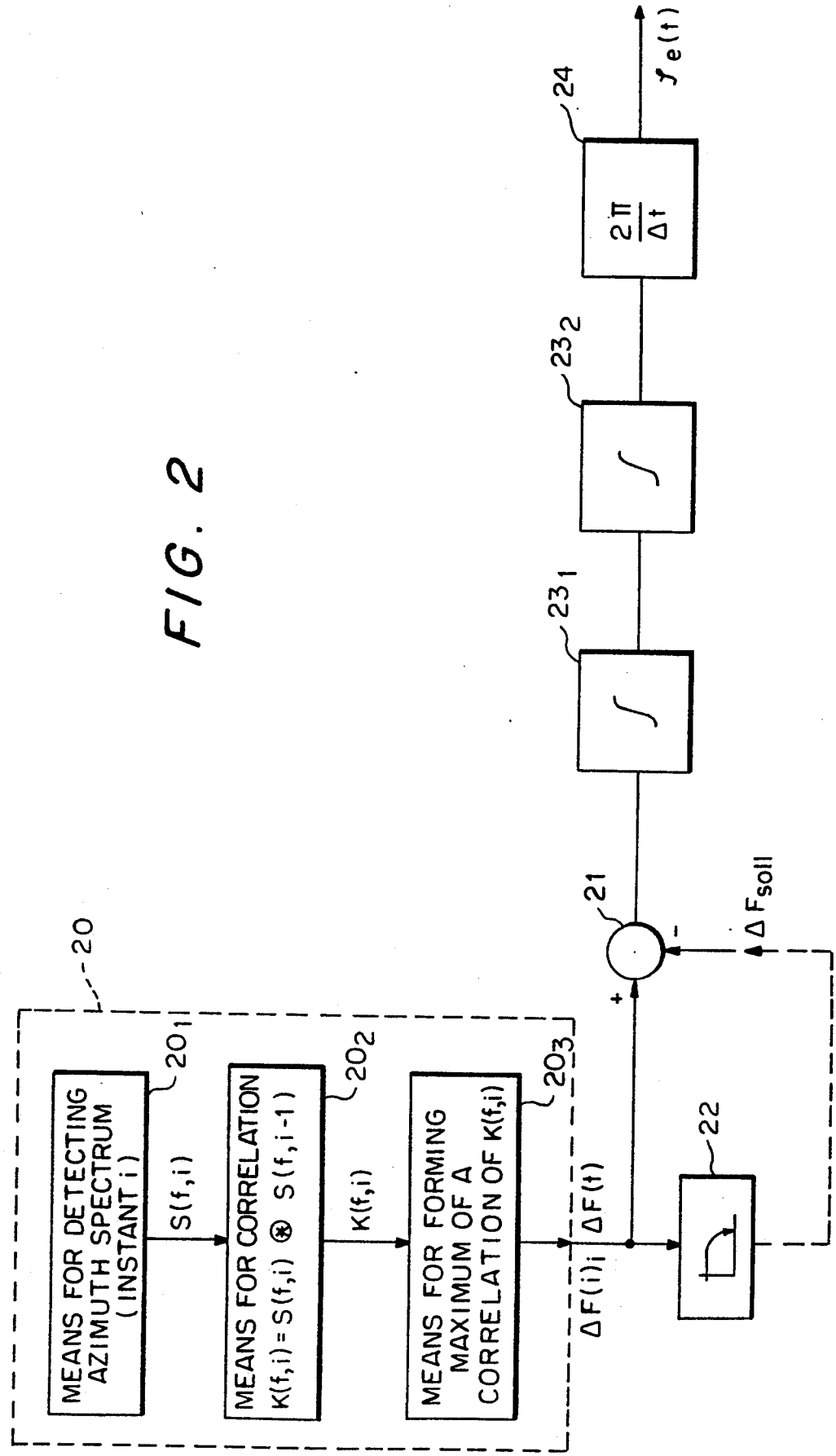
FIG. 2 is a block diagram of an apparatus for carrying out the method according to the invention.

An apparatus for carrying out the method of extracting phase errors caused by the atmosphere in the backscatter signal of a coherent imaging system carried by a carrier from radar raw data is represented in detail in FIG. 2 in the form of a block diagram. In FIG. 2 in an area 20 shown in dashed line means $20_1$ to $20_3$ known to Applicants from DE 39 22 428 C2 are shown for determining the frequency offset $\Delta F(i)$ or $\Delta F(t)$ of the backscatter signal component of an azimuth spectrum by correlation of two consecutive azimuth spectra. Here, over a specific period of time $\Delta t$ using the apparatus $20_1$ for detecting azimuth spectra, successive azimuth spectra, i.e. spectra following each other at different instants i (i being an integer greater than 1) are detected.

Two such azimuth spectra are illustrated schematically for the instants $t=i-1$ or $t=i$ as examples in the left part of FIG. 4. The consecutive azimuth spectra having a power S(f, i) recorded in dependence upon the azimuth frequency f are formed in the means $20_2$ for forming correlations between two respective immediately consecutively taken azimuth spectra, i.e. K(f, i)=S(f, i)  S(f, i−1).

In the following means $20_3$ for forming the maximum of a correlation K(f, i), with the aid of the location of the maximum, the frequency offset $\Delta F(t)$ of the backscatter ratio component is determined as can be seen schematically from the right part of FIG. 4 and corresponds to equation (1) given above.

The means $20_3$ for forming the maximum of a correlation K(f, i) is followed by a means 21 for forming a difference from the frequency offset $\Delta F(t)$ and a frequency offset desired value $\Delta F_{soll}$. If, as explained above, the forward velocity $V_v$ of the carrier is known, the frequency offset desired value $\Delta F_{soll}$ can be calculated with the aid of equation (5) and this value applied to the difference-forming means 21. If the forward velocity $V_v$ of the carrier is not known, the frequency offset $\Delta F(t)$ obtained at the output of the means $20_3$ is conducted through a low-pass filter 22, at the output of which the frequency offset desired value $\Delta F_{soll}$ is then present, since as likewise already explained above the second derivative of the phase error $\phi_e(t)$ does not have a constant level and consequently only the first term of equation (3) is allowed to pass by the low-pass filter 22 in the form of the frequency offset desired value $\Delta F_{soll}$.

The difference-forming means 21 is followed by two integrating units $23_1$ and $23_2$ for carrying out a double integration of the difference obtained ($\Delta F(t)-\Delta F_{soll}$). In a standardizing unit 24 following the second integrating unit $23_2$ a multiplication by the constant $2\pi/\Delta t$ is performed so that at the output of the standardizing unit 24 the phase error $\phi_e(t)$ caused by the atmosphere is available.

The radar raw data can now be corrected by the aid of the phase error $\phi_e(t)$ calculated and thereafter correspondingly processed for recovering a high-resolution image.

The method according to the invention for determining the phase error caused by the atmosphere can also be applied in sonar and lidar systems and the apparatus for carrying out the method according to the invention for determining the phase errors caused by the atmosphere can be implemented in sonar and lidar systems.

We claim:

1. A method of extracting phase errors caused by the atmosphere in the backscatter signal of a coherent imaging radar system carried by a carrier from radar raw data in which for imaging areas with different backscatter ratios over a predetermined period of time successive azimuth spectra are continuously formed and a frequency offset ($\Delta F(t)$) of the backscatter ratio component is obtained by determining the position of the maximum of the correlations between two respective immediately successively formed azimuth spectra, wherein;

performing a double integration of the difference of the frequency offset ($\Delta F(t)$) and a desired value ($\Delta F_{soll}$) of the frequency offset, the frequency offset desired value ($\Delta F_{soll}$) being determined either from the carrier forward velocity ($V_v$) or by a low-pass filtering of the frequency offset ($\Delta F(t)$), and standardizing a result of the double integration by multiplying said result with a constant of ($2\pi/\Delta t$) to obtain the phase error ($\phi_e(t)$).

2. An apparatus for extracting phase errors caused by the atmosphere in the backscatter signal of a coherent imaging radar system carried by a carrier from radar raw data comprising:

means for detecting an azimuth spectrum to form continuously successive azimuth spectra, means for correlation formation between two respective directly successively formed azimuth spectra and means for forming the maximum of the correlation and determining the frequency offset ($\Delta F(t)$);

means for forming a difference from the frequency offset ($\Delta F(t)$) and a desired value ($\Delta F_{soll}$) of the frequency offset, the desired frequency offset ($\Delta F_{soll}$) being determinable from the carrier forward velocity ($V_v$) or by a filtering of the frequency offset ($\Delta F(t)$) by means of a low-pass filter;

two integrating units connected in series and following said difference-forming means; and a standardizing unit which follows the second integrating unit and at the output of which the phase error ($\phi_e(t)$) caused by the atmosphere is obtained.

* * * * *